United States Patent
Krishnan et al.

(10) Patent No.: US 10,558,384 B1
(45) Date of Patent: Feb. 11, 2020

(54) SYSTEMS AND METHODS FOR AUTOMATED INDEXING AND MIGRATING A PLURALITY OF FILES TO A CLOUD COMPUTING DEVICE

(71) Applicant: Capital One Services, LLC, McLean, VA (US)

(72) Inventors: Baskar Krishnan, McLean, VA (US); Brennan Cropper, McLean, VA (US); Jyotisana Dhawan, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/412,465

(22) Filed: May 15, 2019

(51) Int. Cl.
  *G06F 3/06* (2006.01)
  *G06F 21/64* (2013.01)

(52) U.S. Cl.
  CPC ............ *G06F 3/0647* (2013.01); *G06F 3/067* (2013.01); *G06F 3/0619* (2013.01); *G06F 3/0673* (2013.01); *G06F 21/64* (2013.01)

(58) Field of Classification Search
  CPC ...... G06F 3/0647; G06F 3/0619; G06F 3/067; G06F 3/0673; G06F 21/64
  See application file for complete search history.

(56) References Cited

U.S. PATENT DOCUMENTS

2017/0126780 A1* 5/2017 Freitag .................. G06F 3/0604
2018/0284987 A1* 10/2018 Lazier ..................... G06F 3/065

* cited by examiner

*Primary Examiner* — Tamara T Kyle
*Assistant Examiner* — Jesse P Frumkin
(74) *Attorney, Agent, or Firm* — Troutman Sanders LLP; Christopher J. Forstner; John A. Morrissett (57) ABSTRACT

A method for migrating a plurality of files to a cloud computing device, the method including: generating a respective first checksums to the plurality of files; matching individual first metadata of the plurality of first metadata to respective files of the plurality of files; in response to the matching, generating respective second metadata corresponding to the plurality of files, the second metadata including the respective first checksums; transferring the plurality of files from the first storage device to a second storage device, the plurality of files being transferred from the second storage device to the cloud computing device; transferring the plurality of second metadata to a third computing device; generating a respective second checksum corresponding to each of the plurality of transferred files; and comparing the respective second checksum to the respective first checksums included in the second metadata.

14 Claims, 5 Drawing Sheets

SYSTEMS AND METHODS FOR AUTOMATED INDEXING AND MIGRATING A PLURALITY OF FILES TO A CLOUD COMPUTING DEVICE

FIELD OF THE INVENTION

The presently disclosed subject matter relates generally to systems and methods for indexing and migrating a plurality of files to a cloud computing device and, more particularly to automated systems and methods for migrating a plurality of files from a storage device to second storage device over a restricted private access network.

BACKGROUND

In the related art, transferring files to a cloud computing device requires significant oversight and personnel expertise. For example, documents may be transferred electronically using web services that are very slow, demand development and testing efforts, and require real-time monitoring, which requires excess computing power and can negatively impact an entire network of an organization. In other instances, the documents may be physically transferred between the storage device and the cloud computing device. Physical transfer of documents is often time-intensive, labor-intensive, and/or prone to errors and omissions. For example, related art approaches are unable to verify document validity and ensure matching between document and metadata files. Moreover, transferring a significant number of documents (e.g., five million documents) from a vendor's platform to a cloud computing device may take over a month.

Accordingly, a need exists for an improved method for indexing and migrating documents to a cloud computing device. More specifically, a need exists for a more efficient and effective indexing and migration of documents from a storage device to a cloud computing device.

SUMMARY

Aspects of the disclosed technology include methods and systems for indexing and migrating a plurality of files from a storage device to a cloud computing device. Consistent with the disclosed embodiments, the methods may include one or more storage devices, processors, user portals, web servers, and cloud computing devices. A method may include a processor generating a respective first checksum corresponding to each of the plurality of files. The processor may also validate the plurality of first metadata by matching each individual first metadata of the plurality of first metadata to the respective files of the plurality of files. In response to a match, the processor may generate a second plurality of second metadata corresponding to a respective file of the plurality of files. The second metadata may include the respective first checksum corresponding to the respective file. The plurality of second metadata may be transferred to a third storage device and the plurality of files from the first storage device may be transferred to the cloud computing device. The processor may verify the integrity of the transferred files by generating a respective second checksum corresponding to each of the plurality of transferred files and compares the respective first checksum and the respective second checksum.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

In an example scenario, a vendor may transfer a plurality files including metadata from a first storage device (e.g., USB hard drive) to a second storage device (e.g., web server). The first storage device may be any device capable of storing and transferring data. The second storage device may be any device capable of receiving, storing, and transferring data to another device. After receiving the plurality of files, the second storage device processes the plurality of files and corresponding metadata. Also, the second storage device flags any files without proper corresponding metadata, and identifies the flagged documents in a user portal associated with the second storage device. The user portal may receive the missing first metadata associated with the plurality of files and provide the same to the second storage device. The second storage device generates a first checksum for each of the plurality of files, and stores the checksum in respective second metadata. The second storage device transfers the second metadata to a third storage device. The third storage device may be any device capable of receiving and transferring data. The second storage device may transfer the plurality of files to a cloud computing device via a network (e.g., the internet—a series of interconnected computing devices) or the plurality of files may be transferred via a portable storage device (e.g., AWS Snowball®). After transfer of the plurality of files, the second storage device may generate a second checksum for each of the plurality of files which is compared to the respective first checksums in the second metadata to verify the transfer of the plurality of files to the cloud computing device.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
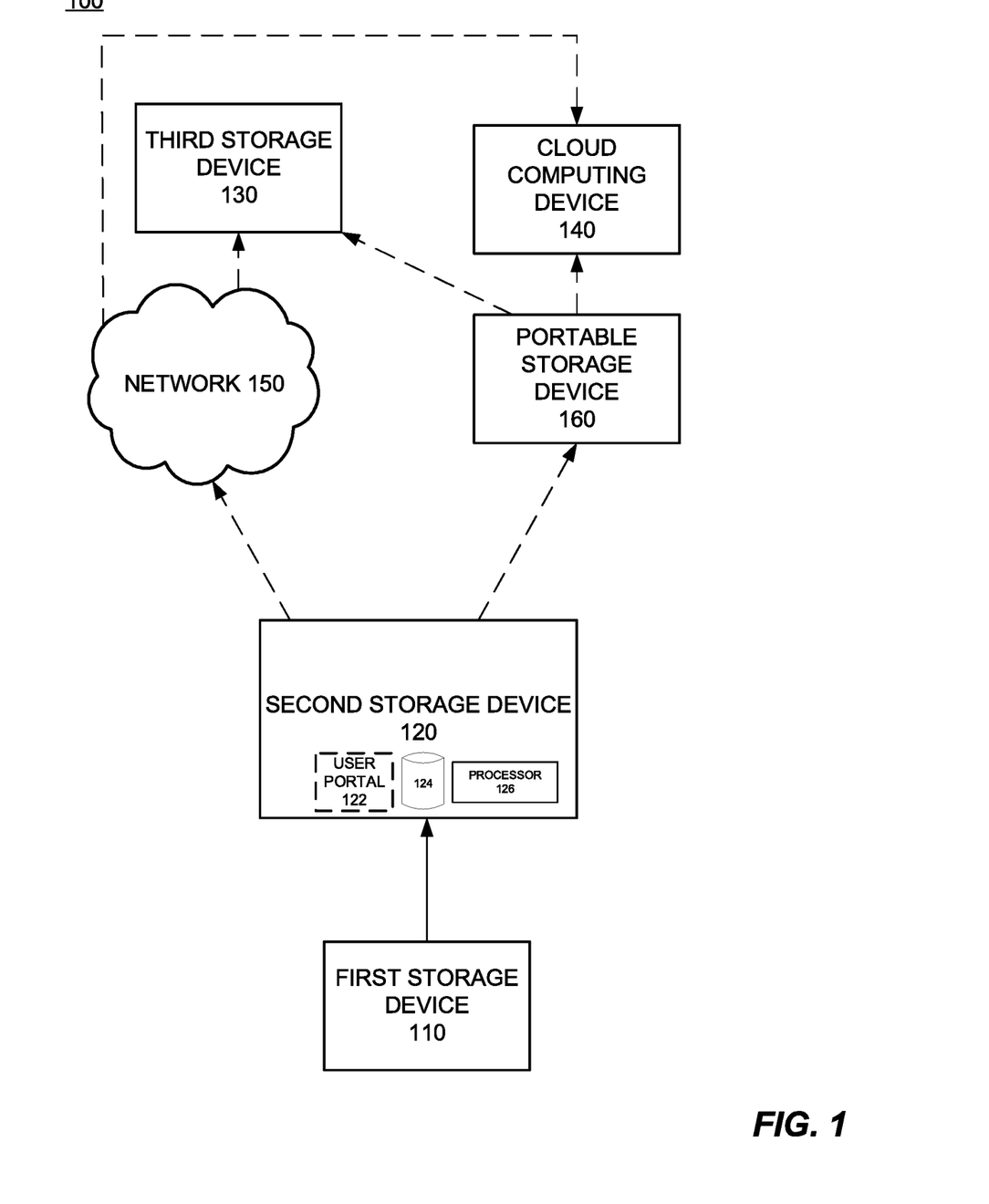
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 includes one or more first storage devices 110, one or more second storage devices 120, one or more third storage devices 130, a network 150, one or more portable storage devices 160, and one or more cloud computing devices 140. As non-limiting examples, the first storage device 110 may be a USB hard drive or an SSD drive. The network 150 may include a network of interconnected computing devices (e.g., the Internet or a local network). The second storage device 120 may include one or more user portals 122, one or more databases 124, and one or more processors 126. The second storage device 120 may run and display one or more applications and the related outputs of the one or more applications associated with the user portal 122. The cloud computing device 140 may include one or more separate cloud storage devices or services. Although third storage device 130 and cloud computing device 140 are separate devices in FIG. 1, this is merely an example and, in some cases, third storage device 130 and cloud computing device 140 may be implemented on a same or overlapping device or group of devices. An example computer architecture that may be used to implement the first storage device 110, the second storage device 120, the third storage device 130, the cloud computing device 140, the network 150, and the portable storage device 160 is described below with reference to FIG. 5.

In certain implementations according to the present disclosure, the second storage device 120 may include one or more user portals 122, one or more databases 124, and/or one or more processors 126 which may be located separately from the second storage device 120, but are associated with the second storage device 120. The second storage device 120 may receive a plurality of files from a first storage device 110. The first storage device 110 may be portable. According to some embodiments, the second storage device 120 may be located within a restricted private access network. The one or more processors 126 may generate a respective first checksum corresponding to each of the plurality of files. The one or more processors 126 may store the corresponding first checksum for each of the plurality of files on the second storage device 120. According to some embodiments, the plurality of files stored on the second storage device 120 may be located within the one or more databases 124. The one or more databases 124 may be located on the same structure comprising the second storage device 120 or said databases 124 may exist in a physically separate manner from the second storage device 120.

The second storage device 120 may match the one or more files of the plurality of files to respective first metadata. Matching the one or more files of the plurality of files to respective first metadata may include matching the individual first metadata to file data of one of the plurality files. The file data may include at least one of a file name, a file type, a file date, and the like. When a match is found, the second storage device 120 may generate respective second metadata for the matched files. The second metadata may include the respective first checksum corresponding to the respective file. In some embodiments, the one or more processors 126 may combine the corresponding first checksum with the matched first metadata to form the respective second metadata. The second storage device 120 may validate the second metadata by confirming the existence of the corresponding second metadata to each of the plurality of files. According to some embodiments, the one or more processors 126 may store the second metadata on the second storage device 120. In some cases, the second storage device 120 may modify the first metadata prior to forming the second metadata.

In response to identifying an unmatched file (e.g., a file without a matching first metadata), the second storage device 120 may flag each unmatched file and associate the unmatched file with only the respective first checksum corresponding to the unmatched file. The one or more processors 126 may transfer an indication of each of the unmatched files to a user portal 122 and receive one or more additional first metadata corresponding to respective files of the one or more files. The one or more additional first metadata may be received from through the user portal 122. In some cases, in response to identifying one or more unmatched files, the second storage device 120 separate the unmatched files from the plurality of files until after receiving the additional first metadata corresponding to the identified at least one file. Thus, the file transfer flow of matched filed may continue, and the unmatched files may be held back while additional files are processed. In some cases, this enhances the system's ability to efficiently and effectively process large number of files.

According to some embodiments, the second storage device 120 may transfer the plurality of second metadata to a third storage device 130. Transferring the plurality of second metadata to the third storage device 130 may be performed offline, for example, via the portable storage device 160. Alternately, the transfer of the plurality of second metadata from the second storage device 120 to the third storage device 130 may be performed over a secure network 150. For example, while the second storage device 120 is connected to the network 150, a processor 126 may output for transmission over the network 150 the plurality of second metadata to a processor associated with the third storage device 130. The third storage device 130 may receive the plurality of metadata by an associated processor when online and connected to the network 150. The second storage device 120 may also transfer the plurality of files to the cloud computing device 140. The transfer of the plurality of files from the second storage device 120 to the cloud computing device 140 may be performed over a secure network 150. According to some embodiments, the transfer of the plurality of files from the second storage device 120 to the cloud device 140 may be performed by loading the plurality of files on a portable storage device 160. The second storage device 120 may output for delivery the portable storage device 160 to a location associated with the cloud computing device 140. The portable storage device 160 is delivered to a physical location of the cloud device 140, and the plurality of files are then uploaded to the cloud device 140.

In some embodiments, the one or more processors 126 verify the integrity of the plurality of transferred files by generating a respective second checksum that corresponds to each of the plurality of transferred files (i.e., by generating a checksum for each of the files transferred to the cloud device 140). The one or more processors 126 may compare the respective second checksum to the respective first checksum included in the second metadata for a match. If the respective first and second checksums match, the file was transferred accurately and has appropriate metadata. Accordingly, the files may be indexed, searched, and retrieved from the cloud computing device 140 based on the second metadata stored on the third storage device 130. This enhances the capabilities of the system by ensuring all files are retrievable, readily retrievable, and more efficiently retrievable, saving processing power and network space.

Figure 2:
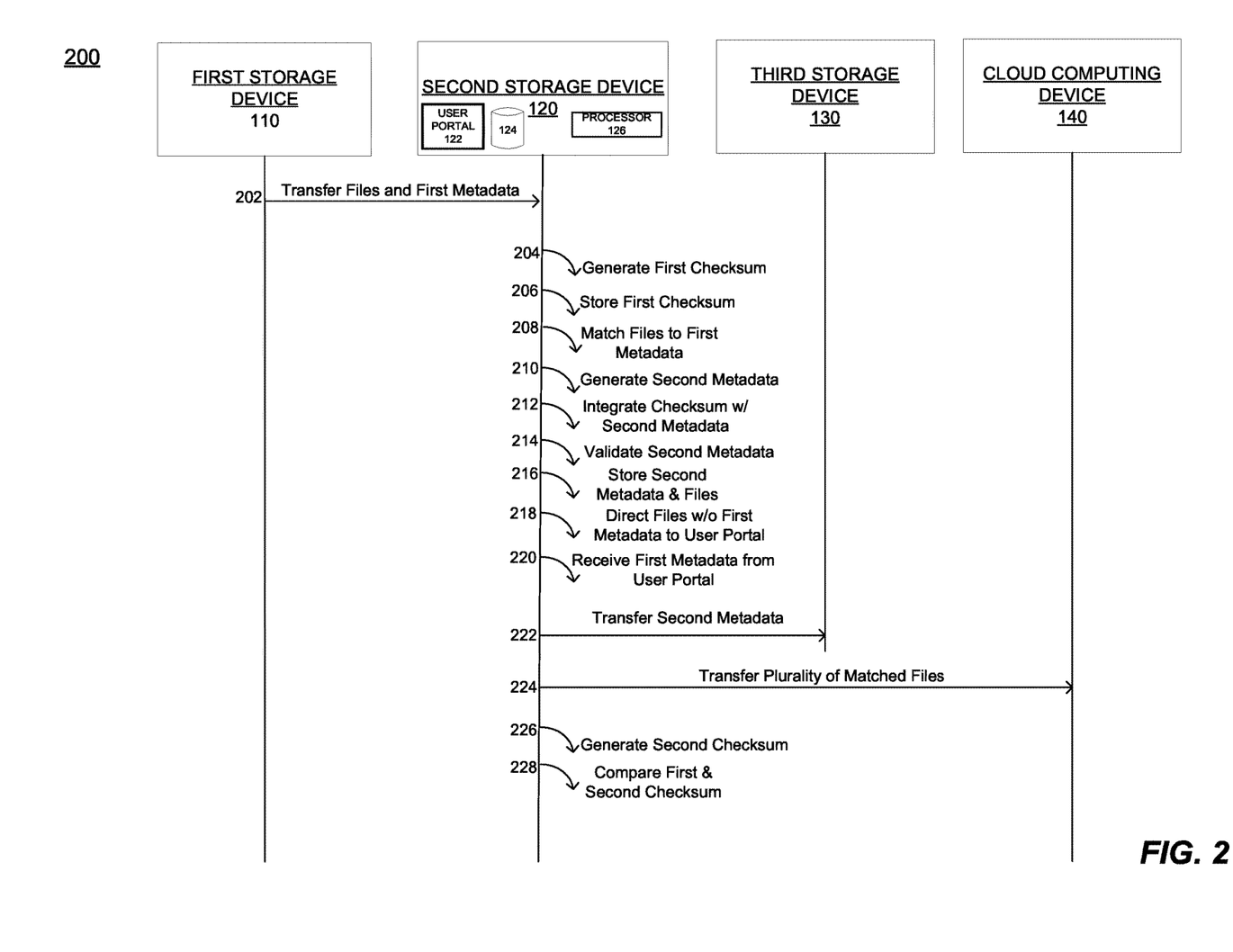
FIG. 2 is an example timing diagram for indexing and migrating a plurality of files from a first storage device to a cloud computing device.

FIG. 2 illustrates an example timing diagram 200 for indexing and migrating a plurality of files from a first storage device to a cloud computing device. According to some embodiments, at 202 the first storage device 110 transfers the plurality of files and first metadata to the second storage device 120. The first storage device 110 may be a portable device (e.g., USB drive or SSD drive). At 204, the processor 126 generates a corresponding first checksum for each of the plurality of files. In some embodiments, a checksum may be generated when the processor 126 runs a checksum algorithm (e.g., an MD5 hash algorithm) on one of the plurality of files, the checksum algorithm generates a string known as a checksum corresponding to the file. Further, according to some embodiments, the processor 126 may generate a unique identifier to be associated with each of the plurality of files. As shown at 206, the processor 126 may store the corresponding first checksum for each of the plurality of files on the second storage device 120. In some embodiments, the processor 126 may store the first checksum 206 in the database 124.

At 208, the second storage device 120 compares the each of the plurality of files to the first metadata to match files to corresponding first metadata. Finding a match may involve comparing the first metadata to file data of the plurality files, wherein the file data is a file name, a file type, a file date, and/or the like, and matching the first metadata to file data of one of the plurality of files. In response to finding a match, respective second metadata corresponding to matched files may be generated by the processor 126, at 210. For example, after the processor 126 finds a match, the respective second metadata may be customized to include additional, different, less, and/or differently arranged fields than the first metadata corresponding to the files. The second metadata may include at least a portion of the file data. At 212, the processor 126 integrates the corresponding first checksum with the respective second metadata. At 214, the second metadata is validated by confirming each second metadata corresponding to a file of the plurality of files. After confirmation, the second metadata and the corresponding plurality of files are stored on the second storage device 120, at 216.

At 218, each of the files without corresponding first metadata (e.g., files that are not matched to first metadata) are identified and an indication of each of the unmatched files is sent by the processor 126 to the user portal 122. At 220, the processor 126 receives from the user portal 122 one or more additional first metadata corresponding to the one or more files without corresponding original first metadata. In some embodiments, receiving one or more additional first metadata may include receiving corrections of the original first metadata performed, as non-limiting examples, by a user, by an algorithm performing suggested corrections, and/or from a dynamic algorithm (e.g., machine learning) performing corrections and/or suggested corrections. The respective first metadata of the additional first metadata is matched to the previously unmatched files, and second metadata corresponding to the previously unmatched files is generated.

At 222, the second storage device 120 transfers the second metadata to the third storage device 130. In some embodiments, the second storage device may transfer only the second metadata to the third storage device 130. The transfer of the second metadata may occur over a secure network 150. In other embodiments, the transfer of the second metadata may occur by loading the second metadata on a portable storage device 160 and delivering the portable storage device 160 to a location associated with the third storage device 130.

At 224, the processor 126 associated with the second storage device 120 transfers the plurality of matched files to the cloud computing device 140. In some embodiments, cloud computing device 140 may provide instructions to processor 126 as to how the plurality of matched files are to be received (e.g., file order based on file type, size, name, etc.). The transfer of the matched files may occur over a secure network 150. In other embodiments, the transfer of the matched files may occur by loading the second metadata on a portable storage device 160 and delivering the portable storage device 160 to a location associated with the cloud computing device 140. After the plurality of files have been transferred to the cloud computing device 140, the processor 126 verifies the validity of each of the files. At 226 the processor 126 generates a corresponding second checksum for each of the plurality of files uploaded on the cloud computing device 140. At 228, the processor 126 compares, for a match, the corresponding second checksum with the corresponding first checksum integrated within the respective second metadata of each of the files uploaded on the cloud computing device 140.

Figure 3:
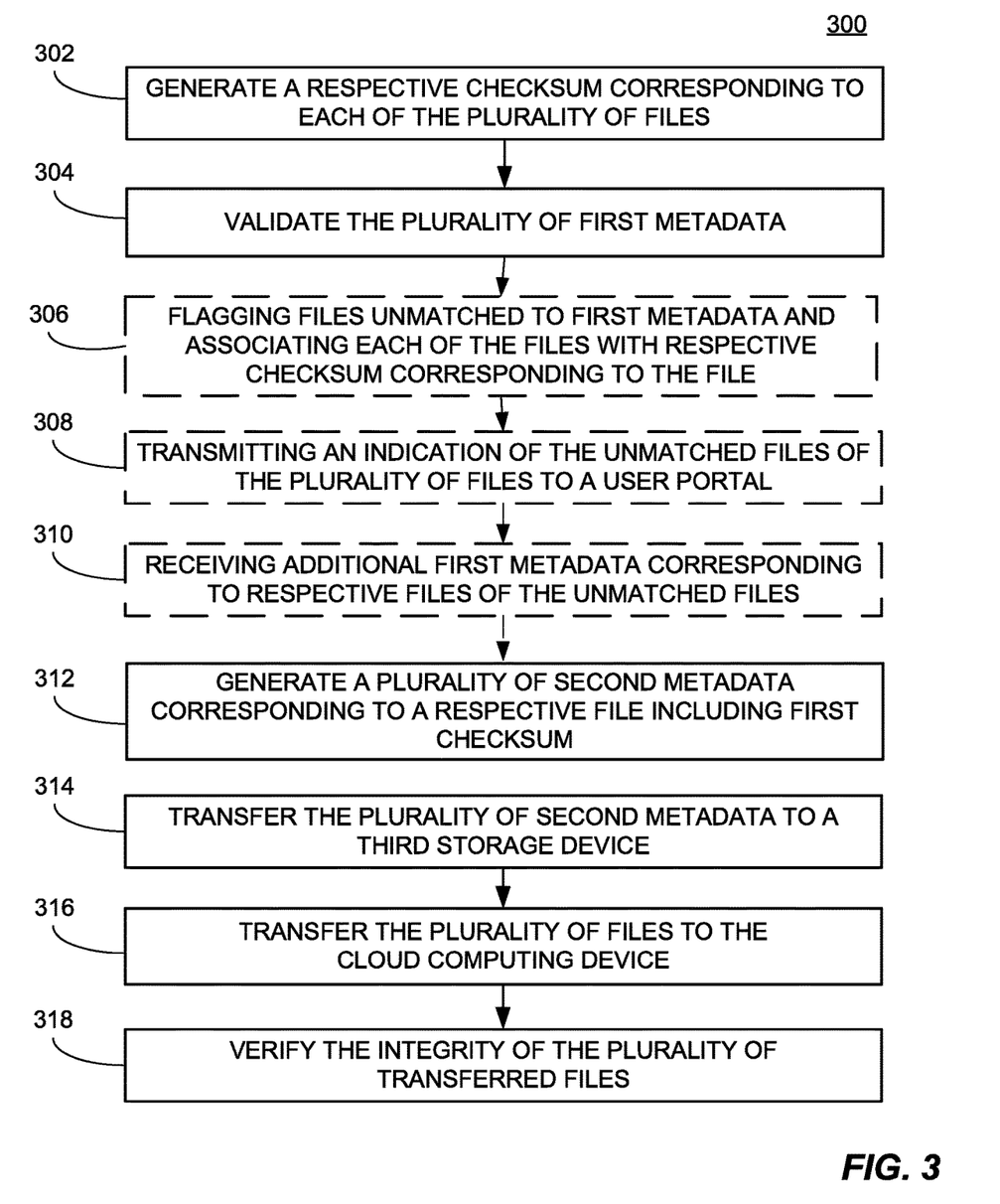
FIG. 3 is an example flow chart of a method for indexing and migrating a plurality of files from a first storage device to a cloud computing device.

FIG. 3 illustrates an example flow chart 300 of a method for indexing and migrating a plurality of files from a first storage device to a cloud computing device. The plurality of files and respective first metadata may be received by the second storage device 120 from a first storage device 110. At 302, processor 126 associated with the second storage device 120 generates a respective first checksum corresponding to each of the plurality of files. At 304, the plurality of first metadata is validated by matching individual first metadata of the plurality of first metadata to respective files of the plurality of files. In some embodiments, matching individual first metadata involves matching the individual first metadata to file data of one of the plurality of files, wherein the file data is at least one of a file name, a file type, and a file date.

Optionally, when one or more files of the plurality of files are unmatched to any first metadata of the plurality of first metadata (e.g., files that do not have corresponding first metadata or unidentified corresponding first metadata), steps 306-310 may be performed to flag and manually update the one or more files. At 306, the second storage device 120 flags each file of the plurality of files and associates each unmatched file with the respective first checksum corresponding to the unmatched file. At 308, the processor 126 transmits an indication of each of the unmatched files of the plurality of files to a user portal 122. At 310, the processor 126 receives one or more additional first metadata (e.g., from the user portal 122). The processor may then validate the additional first metadata to the unmatched files, for example, similar to that discussed above with reference to 304.

At 312, in response to finding a match, the processor 126 generates a second metadata corresponding to each matched file. The second metadata includes the respective first checksum corresponding to the respective matched file.

At 314, the plurality of second metadata are transferred from the second storage device 120 to the third storage device 130. In some embodiments, the transfer may occur over a secure network 150. In other embodiments, the transfer may occur by loading the second metadata on a portable storage device 160 and outputting the portable storage device 160 for delivery to a location associated with the third computing device 130. At 316, the plurality of files are transferred from the second storage device 120 to the cloud computing device 140. The transfer of the plurality of files may occur over a secure network 150. In some embodiments, the transfer may occur by loading the plurality of files on a portable storage device 160 and outputting the portable storage device 160 for delivery to a location associated with the cloud computing device 140. At 318, the processor 126 verifies the integrity of the plurality of transferred files. To verify the integrity of the transferred files, the processor 126 may generate a respective second checksum corresponding to each of the plurality of transferred files and compare the respective second checksums to the respective first checksums included in the second metadata stored on the third computing device 130.

Figure 4:
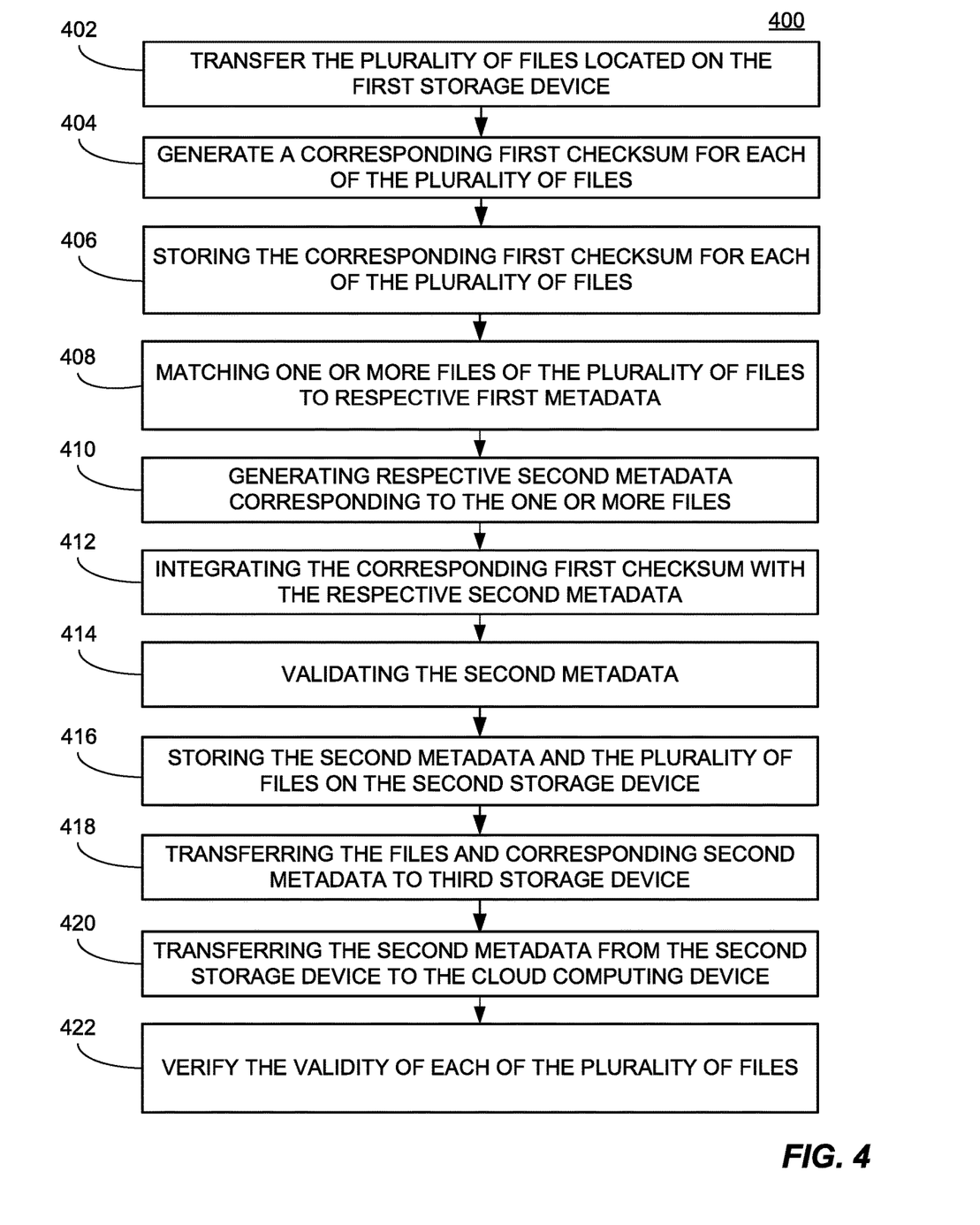
FIG. 4 is an example flow chart of a method for indexing and migrating a plurality of files from a first storage device to a cloud computing device.

FIG. 4 illustrates an example flow chart 400 of a method for indexing and migrating a plurality of files from a first storage device to a cloud computing device. In some implementations, the features described with reference to FIG. 4 may be substantially similar to the corresponding features described above with reference to FIG. 3. At 402, a plurality of files are transferred from the first storage device 110 to the second storage device 120. In some embodiments, the first storage device 110 may be portable. The second storage device 120 may be located within a restricted private access network. At 404, the processor 126 generates a corresponding first checksum for each of the plurality of files on the second storage device 120. At 406, the processor 126 stores the first checksums on the second storage device 120 in association with the corresponding file of the plurality of files.

At 408, files are matched to respective first metadata. In response to finding a match, at 410, the processor 126 generates respective second metadata corresponding to the matched file. At 412, the processor 126 integrates the corresponding first checksum of the matched file with the respective second metadata. The second metadata is validated (i.e., it is confirmed that a complete set of second metadata has been generated) by confirming the existence of the corresponding second metadata to each of the plurality of files, at 414. At 416, the processor 126 stores the second metadata on the second storage device 120. The processor 126 transfers the second metadata from the second storage device 120 to the third storage device 130, at 418. In some embodiments, the second metadata are transferred from the second storage device 120 to the third storage device 130 through a secure network 150. In other embodiments, the transfer of the second metadata may occur by loading the second metadata onto a portable storage device 160 and outputting for delivery the portable storage device 160 to a location associated with the third storage device 130.

At 420, the matched files are transferred to a cloud computing device 140. In some embodiments, the corresponding matched files are transferred from the second storage device 120 to the cloud computing device 140 through a secure network 150. In other embodiments, the files may be loaded on a portable storage device 160 and outputting the portable storage device 160 for delivery to a location associated with the cloud computing device 140. After the plurality of files are uploaded on the cloud computing device 140, at 420, the processor 126 verifies the validity of each of the plurality of files, for example, by generating a corresponding second checksum for each of the plurality of files uploaded on the cloud computing device 140 and comparing second checksums with the corresponding first checksums integrated within the respective second metadata.

Figure 5:
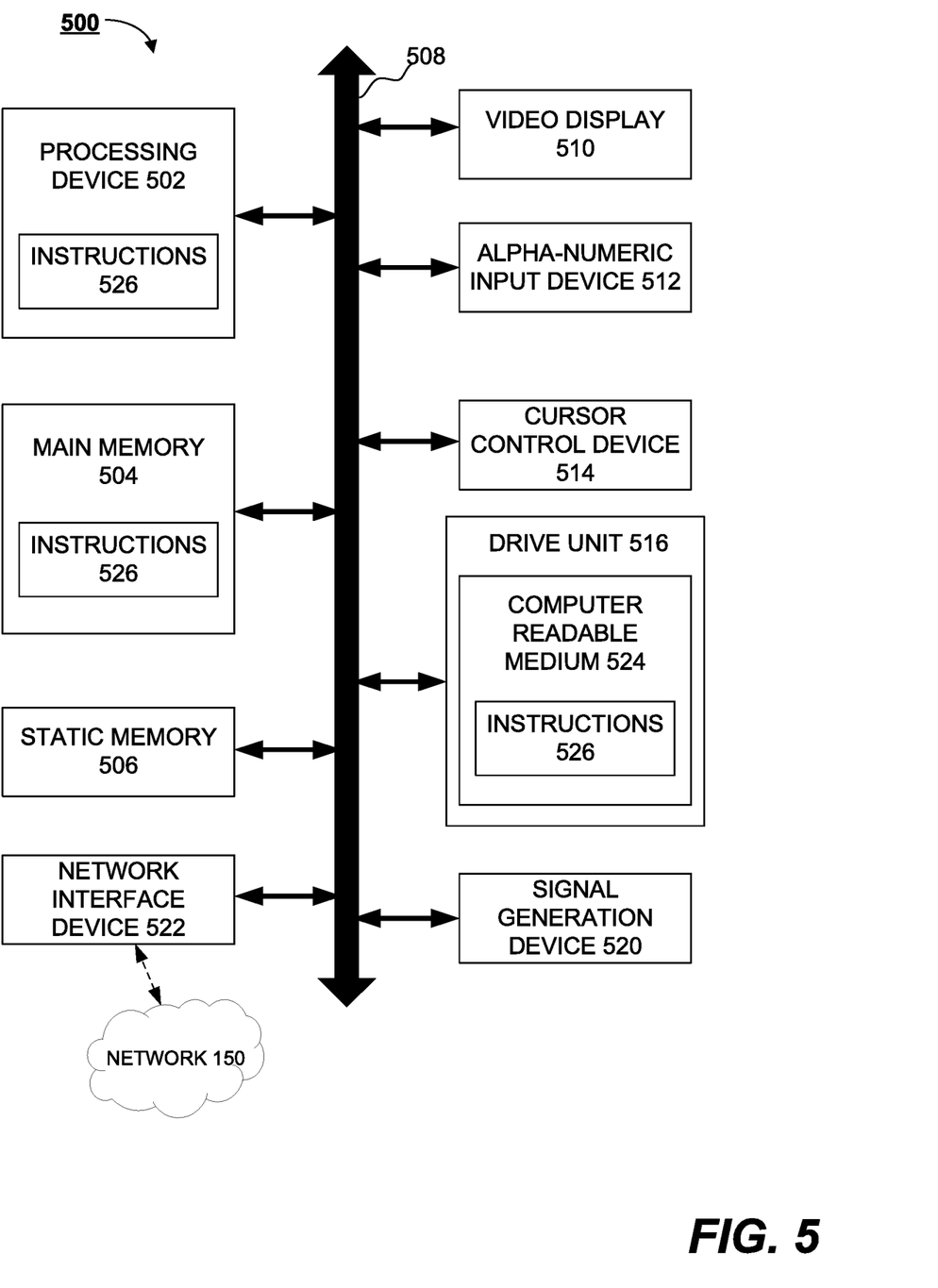
FIG. 5 is a block diagram of an example computer system that may implement certain aspects of the present disclosure.

FIG. 5 is a block diagram of an example computer system 500 that may implement certain aspects of the present disclosure. The computer system 500 may include a set of instructions 526 for controlling operation of the computer system 500. In some implementations, the computer system 500 may be connected (e.g., networked) to other machines in a Local Area Network (LAN), an intranet, an extranet, a satellite communications system, or the Internet. The computer system 500 may operate in the capacity of a server or a client machine in a client-server network environment, or as a peer machine in a peer-to-peer (or distributed) network environment. The computer system 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 500 is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM), etc.), a static memory 506 (e.g., flash memory, static random-access memory (SRAM), etc.), and a secondary memory 516 (e.g., a data storage device), which communicate with each other via a bus 508.

The processing device 502 represents one or more general-purpose processing devices such as a microprocessor, a microcontroller, a central processing unit, or the like. As non-limiting examples, the processing device 502 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 may further include a network interface device 522, which is connectable to a network 150. The computer system 500 also may include a video display unit 510, i.e., a display (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a non-transitory storage medium 524 on which is stored one or more sets of instructions 526 for the computer system 500 representing any one or more of the methodologies or functions described herein. For example, the instructions 526 may include instructions for implementing an asset tracking device including a power source and power management system or subsystem for a container or a trailer. The instructions 526 for the computer system 500 may also reside, completely or at least partially, within the main memory 504 and/or within the processing device 502 during execution thereof by the computer system 500, the main memory 504 and the processing device 502 also constituting computer-readable storage media.

While the storage medium 524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASE

The following example use case describes an example of a particular implementation of indexing and migrating a plurality of files from a first storage device to a cloud computing device. This is intended solely for explanatory purposes and not limitation. In one case, a financial institution wishes to better organize files by moving them from one or more vendors to a cloud service. The files and corresponding original metadata are loaded onto a first storage device and transferred to the financial institution. The financial institution loads the data from the first storage device onto a second storage device. The financial institution generates respective first checksums corresponding to each of the files and validates the original metadata by matching them to corresponding files. When the files and metadata are matched, the financial institution generates second metadata from the first metadata and includes the respective first checksum. The financial institution loads the second metadata to a third storage device for indexing and searching the files. The financial institution also loads the files to a portable storage device and physically transfers the portable storage device to a location associated with a cloud computing device. The files are transferred from the portable device to the cloud computing device. The financial institution verifies the integrity of the transferred files by generating a respective second checksum corresponding to each transferred file and checks the respective second checksum against the respective first checksum within the corresponding second metadata. Through this process, the financial institution can be sure that all files and metadata have been transferred, that each transferred file is uncorrupted, and that each transferred file is searchable and indexed by corresponding metadata.

What is claimed is:

1. A method for indexing and migrating a plurality of files from a first storage device to a cloud computing device, the method comprising:

receiving, at a second storage device, the plurality of files from the first storage device, the plurality of files comprising a first set of metadata;

generating, by one or more processors of the second storage device, a first set of checksums, each checksum in the first set corresponding to one of the plurality of files;

identifying, with the one or more processors, the first set of metadata from amongst the plurality of files;

comparing each portion of metadata from the first set of metadata to a respective file of the plurality of files to determine a match;

generating, by the one or more processors, a second set of metadata, wherein each portion of metadata in the second set corresponds to a respective matched file, and wherein each portion of metadata in the second set of metadata comprises a checksum from the first set of checksums corresponding to the respective matched file;

identifying, by the one or more processors, one or more unmatched files, the one or more unmatched files lacking the metadata of the first set of metadata;

associating, with the one or more processors, each of the one or more unmatched files with a respective checksum from the first set of checksums;

transmitting, by the one or more processors, a first file of the one or more unmatched files to a user portal;

receiving, by the one or more processors, additional metadata for the first file;

appending, by the one or more processors, the additional metadata to the second set of metadata;

transferring, by the one or more processors, the plurality of files from the second storage device to the cloud computing device;

transferring, by the one or more processors, the second set of metadata to a third storage device; and generating a second set of checksums, each checksum in the second set of checksums corresponding to a file of the plurality of transferred files; and comparing, by the one or more processors, each checksum in the second set of checksums to the corresponding checksum in the first set of checksums to verify the integrity of the plurality of transferred files.

2. The method of claim 1, wherein the plurality of files comprise file data, the file data comprising at least one of a file name, a file type, or a file date.

3. The method of claim 1, wherein the second storage device is located within a restricted private access network.

4. The method of claim 1, wherein transferring the second set of metadata to the third storage device comprises transferring the set of second metadata from the second storage device to the cloud computing device through a secure network.

5. The method of claim 1, transferring the plurality of files to the cloud computing device files comprises loading the plurality of files on a portable storage device and delivering the portable storage device to a location associated with the cloud computing device.

6. The method of claim 1, further comprising:
determining, by the one or more processors, a number of the plurality of files successfully transferred to the second storage device;
determining, by the one or more processors, a number of the plurality of files unsuccessfully transferred to the second storage device; and
calculating a percentage of successful transfers of the plurality of files.

7. The method of claim 6, further comprising:
generating, by the one or more processors, a status report indicating at least one of: the number of the plurality of files successfully transferred to the second storage device, the number of the plurality of files unsuccessfully transferred to the second storage device, or the percentage of successful transfers of the plurality of files; and
transmitting, by the one or more processors, the status report to the user portal for display.

8. A method for indexing and migrating a plurality of files from a first storage device to a cloud computing device, the method comprising:
receiving, by a second storage device, the plurality of files from the first storage device;
generating, by one or more processors of the second storage device, a first set of checksums, wherein each checksum in the first set corresponds to one of the plurality of files;
storing, by the one or more processors, each checksum in the first set on the second storage device;
comparing each of the plurality of files to respective metadata in a first set of metadata to determine a match;
generating, by the one or more processors, a second set of metadata, wherein each portion of metadata in the second set corresponds to a respective matched file;
integrating, by the one or more processors, each checksum in the first set with the respective portion of metadata in the second set;
identifying, by the one or more processors, one or more unmatched files, the one or more unmatched files lacking the metadata of the first set of metadata;
associating, with the one or more processors, each of the one or more unmatched files with a respective checksum from the first set of checksums;
transmitting, by the one or more processors, a first file of the one or more unmatched files to a user portal;
receiving, by the one or more processors, additional metadata for the first file;
appending, by the one or more processors, the additional metadata to the second set of metadata;
storing, by the one or more processors, the second set of metadata on the second storage device;
transferring, by the one or more processors and through a secure network, the second set of metadata and the plurality of files to the cloud computing device;
transferring, by the one or more processors, the second set of metadata to a third storage device;
generating, by the one or more processors, a second set of checksums, each checksum in the second set corresponding to a file of the plurality of files uploaded on the cloud computing device; and
comparing, by the one or more processors, each checksum in the second set of checksums to the corresponding checksum in the first set of checksums to verify the integrity of the plurality of transferred files.

9. The method of claim 8, further comprising:
determining, by the one or more processors, a number of the plurality of files successfully transferred to the second storage device;
determining, by the one or more processors, a number of the plurality of files unsuccessfully transferred to the second storage device;
calculating, by the one or more processors, a percentage of successful transfers of the plurality of files;
generating, by the one or more processors, a status report indicating at least one of: the number of the plurality of files successfully transferred to the second storage device, the number of the plurality of files unsuccessfully transferred to the second storage device, or the percentage of successful transfers of the plurality of files; and transmitting, by the one or more processors, the status report to the user portal for display.

10. The method of claim 8, wherein the second storage device is located within a restricted private access network.

11. The method of claim 8, wherein transferring the second set of metadata from the second storage device to the cloud computing device comprises transferring the second set of metadata through a secure network.

12. The method of claim 8, further comprising:
separating, by the one or more processors, the first file from the plurality of files until after receiving the additional metadata.

13. A system for indexing and migrating a plurality of files to a cloud computing device, the system comprising:
a first storage device containing the plurality of files;
a database operable to store the plurality of files;
a second storage device including a user portal;
a cloud computing device operable to store the plurality of files;
a secure network operable to connect the second storage device and the cloud computing device;
one or more processors operable to link the second storage device with the database; and
a memory in communication with the one or more processors and storing instructions that, when executed by the one or more processors, are configured to cause the system to:
transfer, to the second storage device, the plurality of files located on the first storage device;
generate a first set of checksums, each checksum in the first set corresponding to one of the plurality of files;
store each checksum in the first set on the second storage device;
compare respective file data of a first set of metadata to each of the plurality of files to determine a match, the file data comprising at least one of a file name, a file type, or a file date;
generate a second set of metadata, wherein each portion of metadata in the second set corresponds to a respective matched file;
integrate each checksum in the first set with the respective portion of metadata in the second set;
identify one or more unmatched files, the one or more unmatched files lacking the metadata of the first set of metadata;
transmit a first file of the one or more unmatched files to a user portal;
receive additional metadata for the first file;
append the additional metadata to the second set of metadata;
store the second set of metadata on the second storage device;
transfer, through the secure network, the second set of metadata from the second storage device to the cloud computing device;
transfer the plurality of files to a third storage device to be delivered to a location associated with the cloud computing device; and
generate a second set of checksums, each checksum in the second set corresponding to one of the plurality of files uploaded onto the cloud computing device; and
compare each checksum in the first set of checksums to the corresponding checksum in the second set of checksums to verify the integrity of the uploaded files.

14. The system of claim 13, wherein the one or more processors cause the system to:
separate the first file from the plurality of files until after receiving the additional metadata.

\* \* \* \* \*